(No Model.)  6 Sheets—Sheet 1.
C. H. CRAWFORD.
OVERSEAMING MACHINE.
No. 330,469.  Patented Nov. 17, 1885.
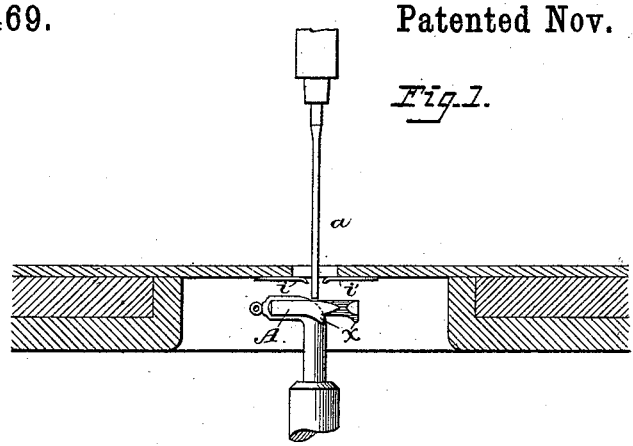
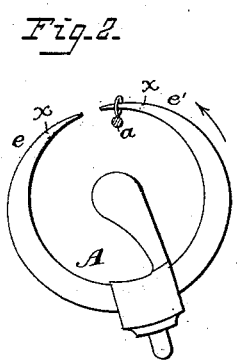
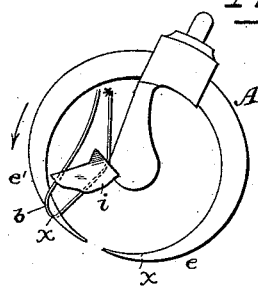
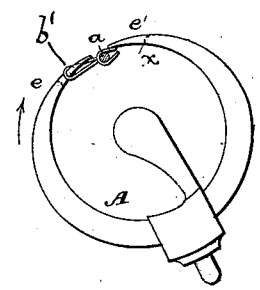
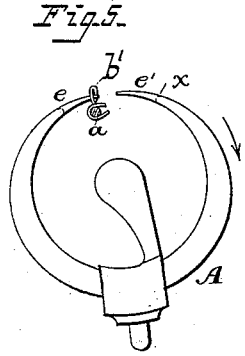
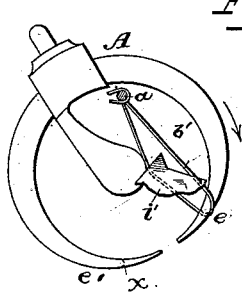
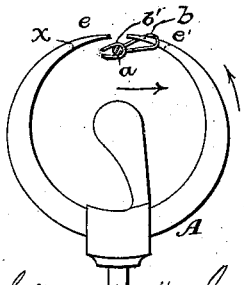
Attest:
Court A Cooper
Wm J Sayers
Charles H. Crawford.
Inventor:
By Foster & Freeman
attys.

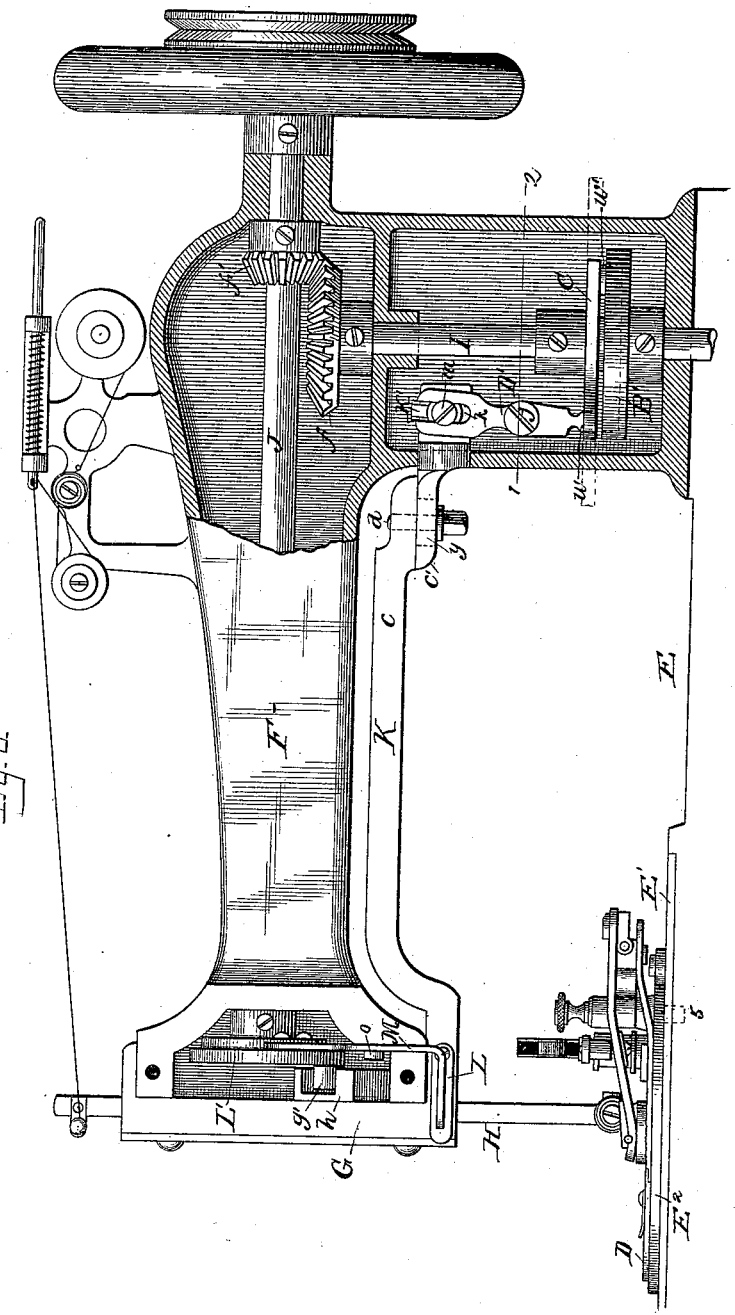

(No Model.)  
6 Sheets—Sheet 3.
C. H. CRAWFORD.
OVERSEAMING MACHINE.
No. 330,469. Patented Nov. 17, 1885.
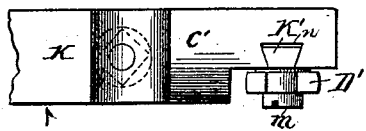
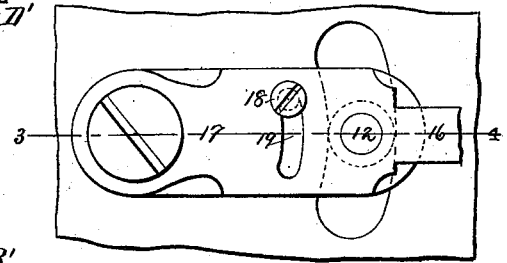
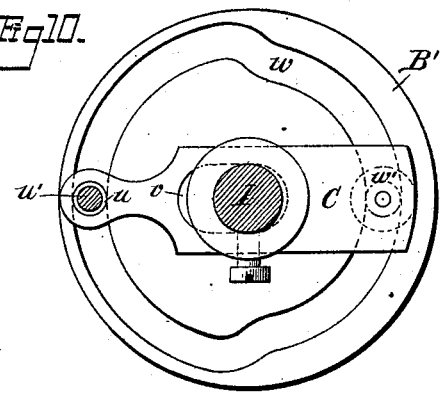
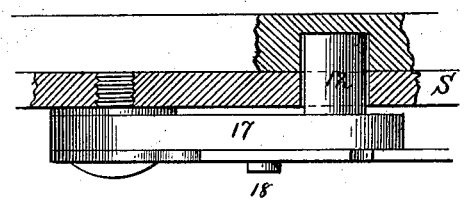
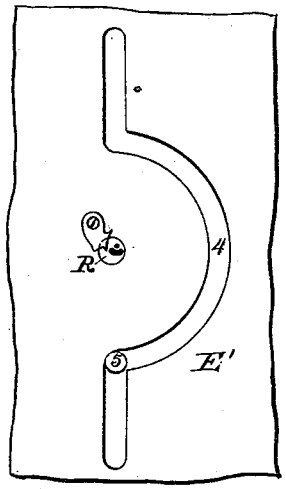
Attests:  
John G. Hinkel  
Wm. F. Ayers.
Charles H. Crawford.  
Inventor  
By Foster & Freeman  
attys (No Model.) 6 Sheets—Sheet 4.
C. H. CRAWFORD.
OVERSEAMING MACHINE.
No. 330,469. Patented Nov. 17, 1885.
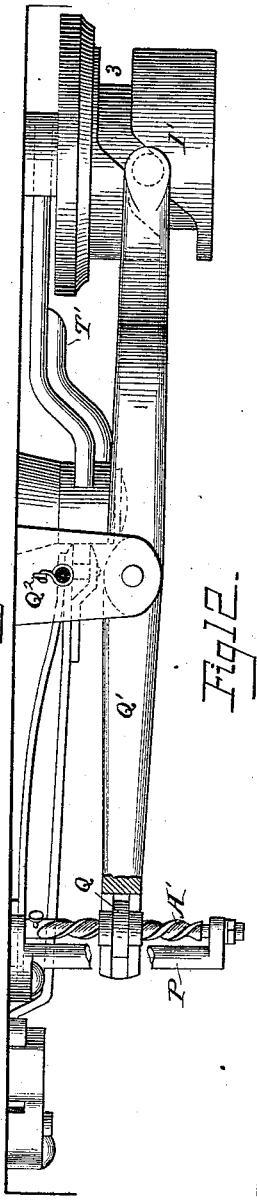
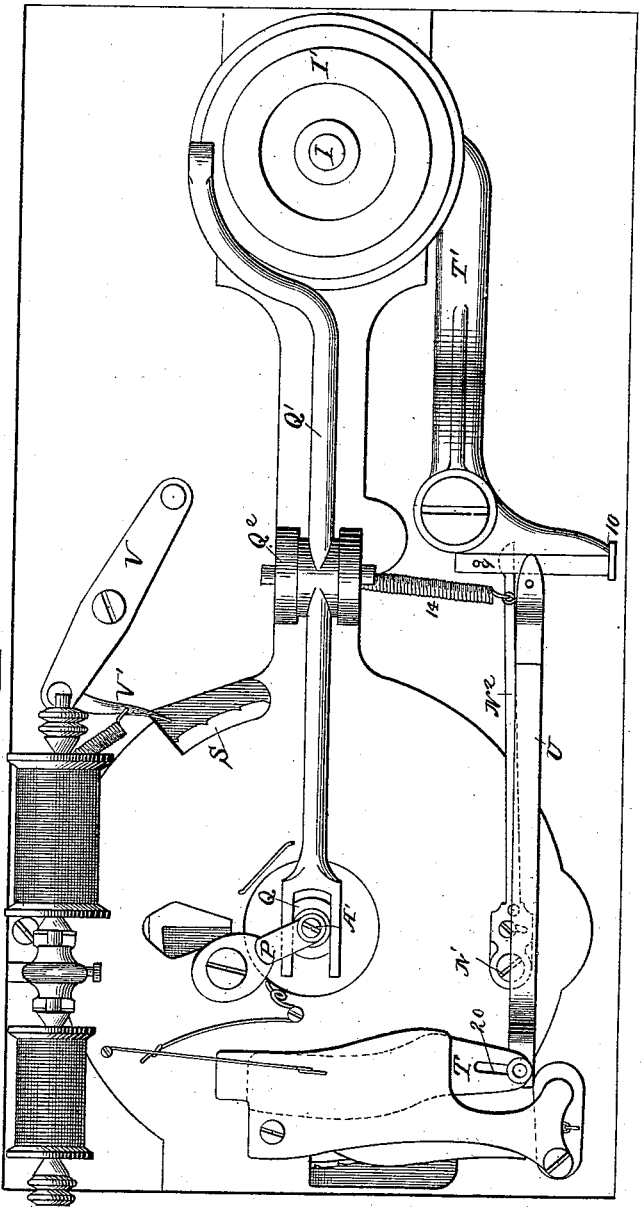

(No Model.)
C. H. CRAWFORD.
OVERSEAMING MACHINE.
No. 330,469. Patented Nov. 17, 1885.
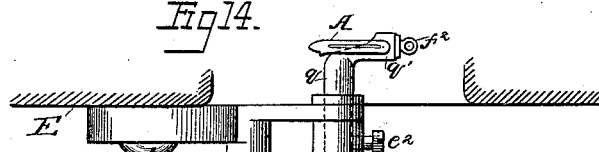
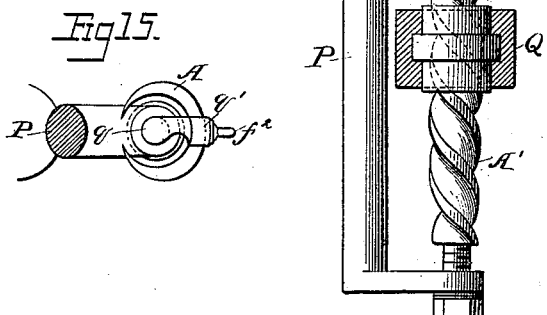
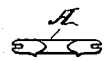
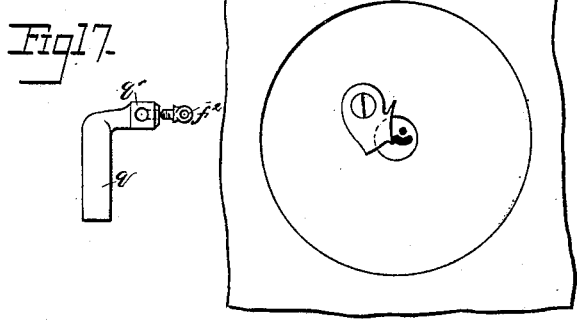

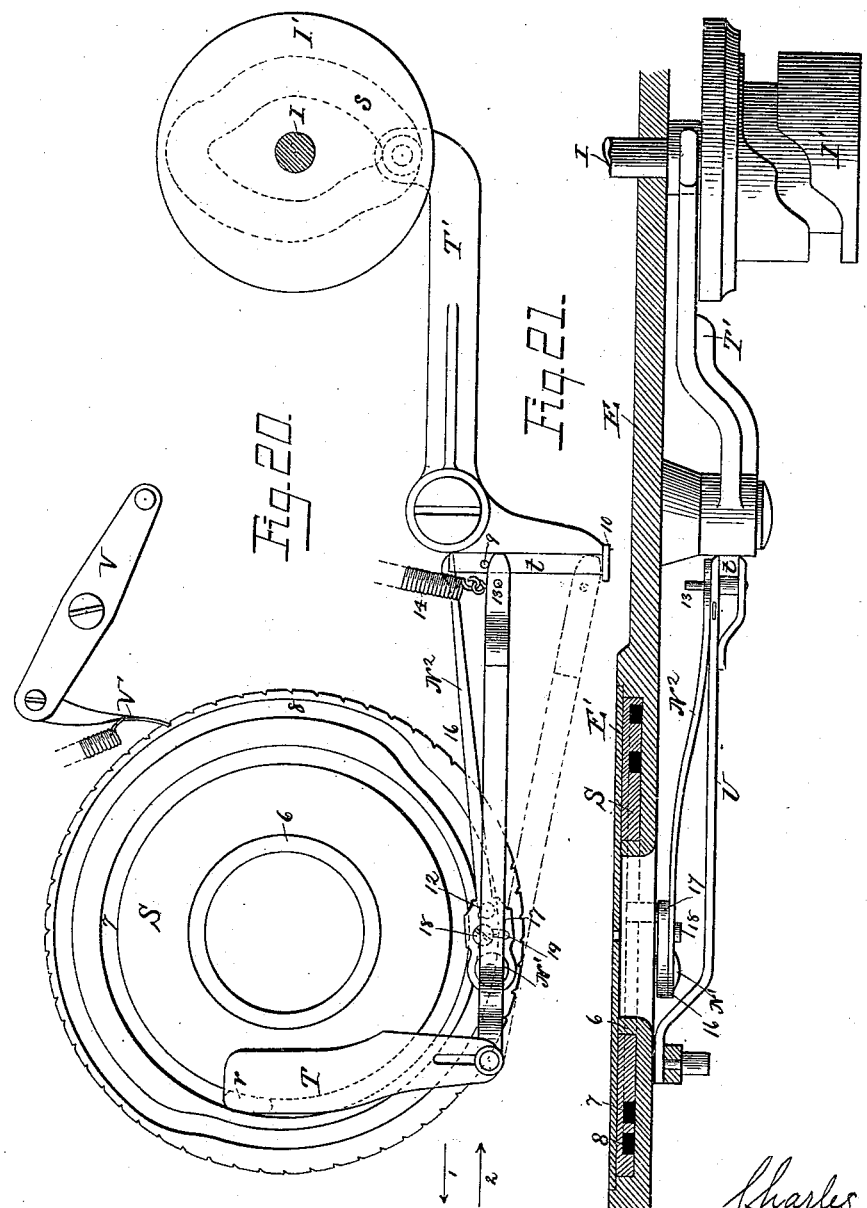

UNITED STATES PATENT OFFICE.

CHARLES H. CRAWFORD, OF NEW YORK, N. Y.

OVERSEAMING-MACHINE.

SPECIFICATION forming part of Letters Patent No. 330,469, dated November 17, 1885.

Application filed November 14, 1884. Serial No. 147,953. (No model.)

*To all whom it may concern:*

Be it known that I, CHARLES H. CRAWFORD, of the city, county, and State of New York, have invented certain Improvements in Overseaming-Machines, of which the following is the specification.

My invention relates to that class of overseaming-machines in which the needle is reciprocated vertically and horizontally, and in which the needle-thread is caught below the fabric by an oscillating or reciprocating loop-catcher; and my invention consists in certain improved constructions, and in certain devices, fully set forth hereinafter, whereby to impart positive movements to the parts of the machine, insure certainty in the operation of the devices which work upon the thread, regulate the movements of the clamp carrying the fabric, and facilitating the adjustments and operations of the parts.

In the drawings, Figures 1 to 7 are views illustrating the operation of devices for operating directly on the thread. Fig. 8 is a longitudinal section showing the bed-plate and the parts above the same. Fig. 9 is a detached plan view of the end of the block-operating bar. Fig. 10 is a section plan on the line 1 2, Fig. 8. Fig. 11 is a sectional elevation showing parts below the base-plate. Fig. 12 is an inverted plan view of the machine. Fig. 13 is a plan of the slotted plate supporting the feed-clamp. Fig. 14 is an elevation of the loop-catcher and supporting-shaft. Fig. 15 is a plan of Fig. 14; Fig. 16, a detached inverted plan showing part of the work-plate and loop-holders. Fig. 17 is a detached view of the loop-catcher-supporting rod. Fig. 18 is an edge view of the loop-catcher. Fig. 19 is a plan view of the loop-catcher. Fig. 20 is a detached view showing the clamp-operating disk and levers and cam for operating the same. Fig. 21 is a longitudinal section through the bed-plate of the machine, showing the parts illustrated in Fig. 20. Fig. 22 is a plan view of one of the levers, drawn to an enlarged scale; and Fig. 23 is a longitudinal section on the line 3 4, Fig. 22.

Before describing the general construction of the machine, I will refer in detail only to the devices which operate directly to form the stitch from a single thread across the edge of the material, the said devices consisting of a needle, $a$, to which both a vertical and horizontal reciprocating motion is imparted, a looper-catcher, A, having two horns or points, $e\ e'$, bent to form a broken circle, and having a rotary reciprocating motion around the center of the circle to bring the horns alternately past the needle, each horn being provided with a shoulder, $x$, and two loop-holders, $i\ i'$, arranged upon the under side of the work-plate and serving to hold the loop after the latter has been carried to it by the horn of the loop-catcher. The needle is operated, as fully set forth hereinafter, so as to descend first through the work and then through the slit or opening or past the edge of the material, in the same manner as in overseaming or button-hole machines heretofore constructed, the work being fed between the vertical movements of the needle as usual.

The parts above described are arranged as shown in Figs. 1 to 7, the operation in stitching being as follows: The needle first descends within the space inclosed by the loop-catcher A, and then slightly rises so as to form a loop of needle-thread $b$, through which the horn $e'$ is caused to pass as the loop-catcher rotates in the direction of its arrow, Fig. 2. As the catcher continues its movement, its shoulder $x$ catches upon the loop until the latter is brought to the position shown in Fig. 3, when the movement of the loop catcher is reversed, and the loop is brought upon the point of the loop-holder $i$, the needle $a$ meanwhile rising to a position above the fabric. The needle now moves to the right and descends through the loop $b$ at the point indicated by the star in Fig. 3, when the loop will be carried down by the tension or take-up off from the loop-catcher, and close around the needle, as shown in Fig. 4, the needle being then at its lowest position. As the needle begins to rise again, the horn $e$ passes through the new loop $b'$, Fig. 5, and the latter is caught by the shoulder $x$ of the said horn $e$, and is carried to the position shown in Fig. 6, the needle rising meanwhile. The loop-catcher now rotates in the direction of its arrow, Fig. 6, and leaves the new loop $b'$ upon the loop-holder, while the previous loop is drawn close to the fabric. The needle now swings in the direction of its arrow, Fig. 7, and descends through the loop $b'$, which is drawn by the take-up from the loop-holder and around the needle, after which the horn $e'$ of the loop-catcher enters and catches and carries a new loop, $b$, as before. By this series of operations the thread is formed into a series of chain-stitches, which are laid in succession over the edge of the fabric, more or less closely in proportion to the extent to which the fabric is fed.

The work-plate D is secured to the base-plate E, provided with the usual overhanging arm, F, at the front of which slides a block, G, carrying the needle-bar H, reciprocating in bearings upon the arm F, and connected to a bar, K, consisting of two parts, $c\ c'$, connected together by the bolt $d$, which extends through a slot, $y$, in the part $c'$ and into the part $c$, the part $c'$ of the bar sliding through an opening in the vertical portion of the overhanging arm F. Through the vertical portion of the arm F extends the driving-shaft I, carrying a cam-cylinder, I', at the lower end, and at the upper end a beveled pinion, $f$, which gears with a similar pinion, $f'$, upon a shaft, J, extending through the horizontal portion of the overhanging arm, and being provided at the forward end with a cam-disk, L', and pin $g'$, which extends between bearings $h\ h$ on the needle-bar, and imparts the vertical reciprocating motion to the latter. To the shaft I above the base-plate is secured a cam-disk, B', (see Figs. 8 and 10,) having in the upper face a cam-groove, $w$, into which projects a pin, $w'$, from a slide, C, provided with a slot, $v$, through which the shaft I extends, and having at the inner end an opening or socket, $u$, receiving a spherical enlargement, $u'$, upon the end of a lever, D', pivoted to a stud, $j$, within the arm F. At the upper end of the lever D' is a slot, $k$, which receives a stud or pin, $m$, carried by a slide, K', adapted to a dovetailed groove, $n$, in the end of the bar K.

As the cam-disk B' revolves, the slide C is carried back and forth upon the shaft I, and the lever D' is vibrated, the block G being thereby carried back and forth to an extent which may be varied by altering the vertical adjustment of the stud $m$, this being effected by making the said stud in the form of a screw-pin and extending it through the slide K', so as to bear against the bottom of the socket $n$, whereby the turning of the stud loosens the slide and permits it to be adjusted vertically, after which it is secured by turning the stud in the opposite direction so as to jam the slide in its slot.

It will be seen that by the combination with the bar K of the disk B', slide C, and lever D', the desired reciprocation of the bar and block is effected positively, and through the medium of very simple mechanism easily adjusted and not liable to get out of order. By loosening the pin $d$, one portion of the bar K may be moved longitudinally independently of the other, so as to permit the needle-bar to be set in any desired position, thereby regulating the position in which it reciprocates.

Although I have shown the slide C as slotted and having its bearings upon the shaft I, it may have its bearings upon any stationary portion of the frame. For instance, it may be extended through the sides of the overhanging arm, as shown in dotted lines, Fig. 8.

The thread should be clamped at the moment that the loop-catcher is being withdrawn through the loop. This is effected by means of an elastic or spring tongue, L, fastened at one end to the bar K, and between which and the bar the thread is passed, and by an L-shaped lever, M, pivoted at $o$ to the overhanging arm, and bearing at the upper end against the cam L' upon the shaft J, which cam is so constructed as to throw out the upper end of the lever M, and cause the lower end of the latter to bear upon the clamp L and clamp the thread at the proper moment.

The loop-catcher A is carried by a screw-shaft, A', turning in bearings upon a frame, P, pendent from the under side of the base-plate E, and a nut, Q, adapted to the screw of said shaft, slides between bearings at the forked end of a lever, Q', pivoted to a bracket, $Q^2$, pending from the under side of the base-plate, and having at the end a stud adapted to a cam-groove, 3, in the periphery of the cam-cylinder I'. As the cam-cylinder revolves, the lever Q' is vibrated and the nut Q is reciprocated vertically, thereby imparting a reciprocating rotary motion to the screw-shaft A', the nut sliding to a limited extent upon its bearings upon the lever.

In order to permit the ready detachment of the loop-catcher for repairs, or to change the same in adapting the machine to different kinds or qualities of work, and to adjust the same to operate effectively with the needle, I construct it in the form of a bent double-pointed bar and connect it detachably to the bent portion or arm of a rod, $q$, secured detachably to or forming part of the screw-shaft A. As shown, the rod $q$ is adapted to a socket in the end of the screw-shaft A', and is secured by means of a set-screw, $e^2$, and the arm $q'$ of the rod has a transverse perforation to receive the loop-catcher bar, and a set-screw, $f^2$, serves to hold the said bar in any position to which it may be adjusted. By loosening the screws $e^2$ $f^2$ the loop-catcher may be set at any desired height and angle and there secured, and by loosening the screw $f^2$ the loop-catcher may be removed and replaced without altering the adjustment of any other parts of the machine.

As in other machines of this character, the base-plate E carries a plate, E', having a slot, 4, adapted to receive a pin, 5, upon the usual clamp-plate, $E^2$, which slides and turns upon a central stud, R, upon the plate E', the sides of a button-hole being carried beneath the needle as the stud 5 moves along the straight portions of the slot 4, and the end of the button-hole being carried beneath the needle as the clamp-plate revolves and the stud 5 passes through the curved portion of the slot.

The sliding and rotary movements of the clamp-plate are effected by the rotation of a disk, S, fitting a recess in the base-plate E, and turning upon an annular flange, 6, and covered by the plate E'. As the manner in which the clamp-plate is caused to slide and rotate by the movemement of the disk S does not differ from that in ordinary machines, and is well known to those skilled in the art, I will not more particularly describe the same.

The rotation of the disk S is effected by means of a feed-lever, T, having a biting-rib, $r$, which enters an annular groove, 7, in the under side of the disk S, and which is jammed therein, biting against the opposite edges of the groove whenever the outer end of the lever is thrown in the direction of the arrow, Fig. 20, thereby causing the disk to move with the lever, and which slides in the groove, when the lever is drawn back, in the direction of the arrow 2, Fig. 20, leaving the disk stationary. The reciprocating movement of the lever is effected by the rocking of a crank-lever, T', a stud upon the long arm of which enters a groove, $s$, in the upper face of the cam-disk I', the short arm having a straight bearing, $t$, adapted to receive the forked end of a connecting-rod, U, attached to the end of the feed-lever T. As the lever T' is rocked, the connecting-rod U is reciprocated and the lever T is vibrated to an extent increasing in proportion as the free end of the connecting-rod U is carried from the position shown in full lines toward that shown in dotted lines, Fig. 20, stops 9 and 10 limiting the throw of the connecting-rod. By adjusting the connecting-rod upon the bearing $t$ the extent to which the disk S is fed at each vibration of the feed-lever is regulated, so that the movement may be increased at such time as the clamp-plate is to be carried round during the operation of overseaming the end of the button-hole, a more rapid movement being required at this time.

The adjustment of the connecting-rod U is effected automatically by the action of a cam-groove, 8, in the under side of the disk S. Thus a lever, N², is pivoted to the under side of the base-plate by a screw-pin, N', (see Figs. 12 and 20,) above the connecting-rod U, and is provided with a stud, 12, which enters the cam-groove 8, and the latter is of such construction as to throw out the lever N², and bring the latter against a pin, 13, upon the end of the rod U, whenever the said rod is to be moved toward the position shown in dotted lines, Fig. 20, a spring, 14, tending to carry the said rod back to the position shown in full lines.

In order to alter the throw of the lever N², the latter is made in two parts, the longer arm or part, 16, being adjustably connected to a shorter arm or part, 17, and the latter carrying the stud 12. Thus the parts 16 and 17 both vibrate upon the pin N', and a set-screw, 18, passes through a slot, 19, in the arm 16 and into the part 17, so as to permit the latter to be moved to any desired angle to the arm 16 and there secured. It will be apparent that other means than those described for automatically adjusting the connecting-rod U, or for varying the throw of the feed-lever, may be employed. For instance, the inner end of the rod may be pivoted to the lever T', and the outer end may be provided with a pin adjustable in a slot, 20, in the lever T.

The disk S may be moved by hand, in order to adjust the clamp-plate when the machine is at rest, by means of a lever, V, pivoted to a pin beneath the base-plate, and carrying a pawl, V', engaging with notches at the edge of the disk.

Different means may be employed for reciprocating the shaft A'. For instance, a pinion may be placed upon the said shaft to engage with a reciprocating rack-bar or segment. Different means may also be employed for reciprocating the slide C, and the adjustable bearing may be at the fulcrum of the lever D' instead of at the end thereof.

Many of the features above described may be used in double-thread machines, in which case the lower thread will be carried by the loop-catcher, provided with a suitable eye for the purpose.

Without limiting myself to the precise construction and arrangement of parts shown and described, I claim—

1. The combination, in an overseaming sewing-machine, of a reciprocating needle, two stationary loop-holders, and a curved loop-catcher having two horns and two shoulders, and means for imparting a reciprocating rotary motion to the same in unison with the reciprocations of the needle to cause the horns to successively carry the loops from the needle to the holders, substantially as set forth.

2. The combination of the reciprocating shaft carrying a double-pointed loop catcher provided with a shoulder near each point, as described, an eye-pointed needle, a plate having two fixed loop-holders, mechanism for reciprocating the needle vertically and horizontally, and mechanism for imparting a rotary reciprocating motion to the loop-catcher, substantially as set forth.

3. The combination of the vertically and horizontally reciprocating needle having an eye in its point, the shaft carrying a loop-catcher, naving two fixed horns and two shoulders, mechanism for imparting a reciprocating rotary motion to the loop-catcher, and two stationary loop-holders, all arranged to operate substantially as set forth.

4. The combination of the eye-pointed needle and means for reciprocating the same horizontally and vertically, and double horned and shouldered loop-catcher, and a vertical shaft supporting the said loop-catcher, and two fixed loop-holders, and means for reciprocating the said shaft, substantially as described.

5. The combination, with the supporting-shaft A', of a laterally-extended arm, and a loop-catcher consisting of a curved bar extending through and fitting detachably the arm carried by the said shaft, substantially as set forth.

6. The combination, with the shaft A', carrying a lateral arm, of the curved loop-catching bar fitting a recess in the said arm, and a set-screw, $f^2$, substantially as set forth.

7. The combination, with the recessed shaft A' and set-screw $e^2$, of a rod, $q$, having a lateral arm, and a loop-catcher consisting of a curved bar extending through said arm, substantially as set forth.

8. The combination of the shaft A', provided with a socket and set-screw, $e^2$, the rod $q$, fitting said socket and provided with an arm, $q'$, having a transverse opening, and set-screw $f^2$, and a curved loop-catcher bar adapted to said opening, substantially as described.

9. The combination, in an overseaming sewing-machine, of a curved loop-catcher having two horns and two shoulders and carried by and vertically adjustable in respect to a shaft, A', and two loop-holders, $i\ i'$, substantially as set forth.

10. The combination, with the block G, bar K, lever D', and slide C, of a cam-disk, B', upon the driving-shaft I, provided with a cam-groove receiving a stud upon the slide, substantially as set forth.

11. The combination, with the block G, carrying the needle-bar, bar K, driving-shaft I, cam-disk B', and lever D', of a slide, C, having a slot through which the driving-shaft passes connected to the lever D' and provided with a stud adapted to a groove in the cam-disk, substantially as described.

12. The combination, with the bar K, block G, needle bar and lever D', and operating-cam, of a stud, $m$, adapted to the forked end of the lever and secured to a slide connected adjustably to the bar K, substantially as set forth.

13. The combination, with the block G, needle-bar, and bar K, having a dovetailed recess, of a slide adapted to said recess, and a screw-stud, $m$, extending through said slide, substantially as and for the purpose set forth.

14. The combination, with the disk S, constructed to carry the clamp of an overseaming-machine, and provided with an annular groove, 7, of a feed-lever, T, provided with a rib fitted to said groove and constituting the fulcrum of the lever, and reciprocating rod U, connected to the end of the lever, substantially as described.

15. The combination of the grooved disk S, feed-lever T, crank-lever T', and rod U, connected to the lever T, sliding at the opposite end upon the bearing of the lever T', substantially as described.

16. The combination of the disk S, having grooves 7 and 8, feed-lever T, crank-lever T', rod U, connected at one end to the lever T, and adjustable at the other on the lever T', and lever $N^2$, adapted to bear upon the rod U, and provided with a stud adapted to the groove 8 of the disk, substantially as set forth.

17. The combination, with the disk S, feed-lever T, crank-lever T', and rod U, of a lever, $N^2$, consisting of two parts adjustably connected, one of said parts carrying a stud adapted to a groove, 8, in the disk S, substantially as set forth.

18. The combination, with the loop-catcher, screw shaft and nut, operating-lever Q', and crank-lever T', connected to the feed devices, of a cam-cylinder, I', having a cam-groove, 3, at the periphery, and a cam-groove, $s$, at the top, substantially as set forth.

In testimony whereof I have signed my name to this specification in the presence of two subscribing witnesses.

CHARLES H. CRAWFORD.

Witnesses:
CHARLES E. FOSTER,
W. C. DUVALL.